July 26, 1966        F. O. LURSEN        3,262,377

TROWELING MACHINE

Filed Dec. 6, 1963        2 Sheets-Sheet 1

FRED O. LURSEN
*INVENTOR.*

BY *Lucas J. W Foster*
HIS ATT'Y

July 26, 1966  F. O. LURSEN  3,262,377
TROWELING MACHINE

Filed Dec. 6, 1963  2 Sheets-Sheet 2

FRED O. LURSEN
INVENTOR.

BY
HIS ATT'Y

United States Patent Office 3,262,377
Patented July 26, 1966

3,262,377
TROWELING MACHINE
Fred O. Lursen, 18th Ave., Freeport, Ill.
Filed Dec. 6, 1963, Ser. No. 328,562
10 Claims. (Cl. 94—45)

This invention pertains to machines for troweling Portland cement concrete and more particularly to such a machine adapted to be operated by one man without an additional power source.

Troweling of Portland cement concrete for sidewalks or the like has always been a tedious job. In recent years power driven trowelling machines driven by gasoline or electric motors have appeared and have been used successfully. However, these latter machines are expensive to purchase and to operate.

By my invention I provide a trowelling machine suitable for a small operator who cannot afford a power driven machine. My trowelling machine is particularly adapted to use on sidewalks or the like, but is not necessarily restricted thereto. It is also built so that it can be easily carried in a pickup truck or similar conveyance such as might be used by the smaller contractor.

A more complete understanding of my invention and the embodiment thereof may be had from a study of the following specifications and the figures in which.

Figure 1:
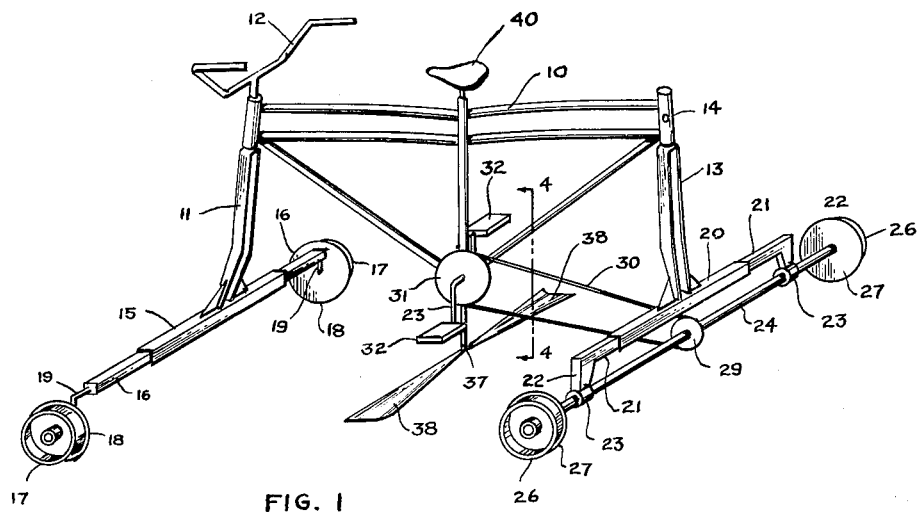
FIG. 1 is a pictorial view of the machine of my invention.
Figure 2:
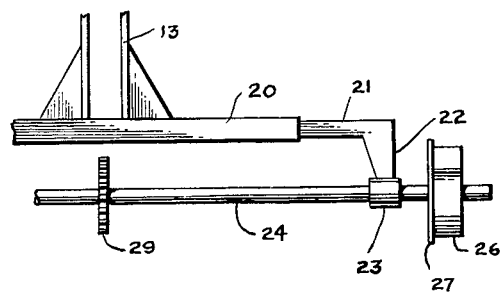
FIG. 2 is a partial elevational view to an enlarged scale showing the rear axle of my machine.
Figure 3:
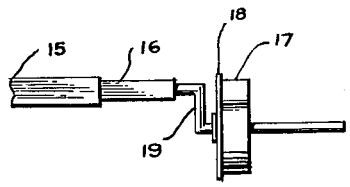
FIG. 3 is a view similar to FIG. 2, but showing the front axle.
Figure 4:
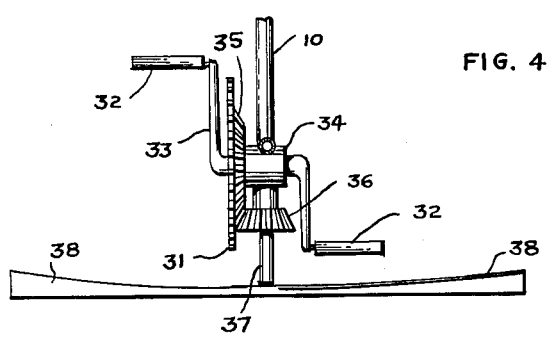
FIG. 4 is a partial view from line 4—4 of FIG. 1.

Briefly my invention comprises a trowelling machine mounted on axles having wheels adapted to ride on the forms used for forming the edges of side walks or the like. The trowelling sweeps are pedal driven, and the machine is also moved by the power transmitted from the foot pedals.

More specifically and referring to the drawings, I provide a machine mounted on a frame 10 which may be in the nature of a bicycle frame. At each end of the frame 10 is pivotally journalled a fork similar to a front fork of a bicycle. The front fork 11 is steerable by means of a bicycle type handle bar 12 which is fixed to the fork as in any common bicycle. The rear fork 13 is freely pivotal subject only to being locked in any given position by a set-screw 14 or similar clamping means.

The axles of my device are adapted to be lengthened or shortened to accommodate various widths between the forming rails (not shown) usually used in sidewalk construction. The front axle is formed of a length 15 of square tubing fixed to the lower end of the fork 11. The extension tube 16 on each side is slidable within the initial length of tubing to form a telescoping axle. At its outer ends, the axle carries wheels 17 having flanges 18. These wheels are preferably carried on offset steel axles 19 so that the main axle will be raised well above the surface to be trowelled. The bearings of the wheels are preferably roller or ball bearings to permit the easiest rolling of the machine.

The rear carrier member is formed somewhat similarly to the front axle having a center square member 20 and rear extension members 21 slidably engaged therewith to form a telescoping rear carrier. In this case, I form the extension members 21 with an offset arm 22 carrying a bearing journal holder 23. This holder carries a bearing journal in which the rear axle 24 is rotatably journalled.

Wheels 26 having flanges 27 are releasably fixed to the rear axle 24 and are adapted to be driven thereby. In order to accommodate different widths of sidewalks, I make my wheels slidable on the axle so that they can be adjusted for the width between them. Various methods can be used to accomplish the adjustment while still retaining the driven engagement. The simplest is probably a simple setscrew in the wheel, engaging the axle 24. A flat surface may be formed on the axle, or a keyway in it to provide more positive engagement. It would also be possible to provide a key in the wheel and keyway in the axle or to provide splined engagement between the wheel and axle. All of these means are well known in the art.

The rear axle 24 is driven through a sprocket 29 fixed to the shaft. This sprocket in turn is driven by a chain 30 which is in turn pulled by a sprocket 31. It will be apparent that the forward speed of the machine may be regulated by adjustment in the size of the wheels 26, and the relative size of the sprockets 29 and 31.

A pair of pedals 32 is mounted on a crank 33 which is journalled in a bearing 34 on the frame 10 in a manner similar to a set of bicycle pedals. The sprocket 31 is fixed to the crank 33 and is driven thereby. Also fixed to the crank 33 or to the sprocket 31 is a bevel gear 35 which meshes with a bevel gear 36 rotatably journalled in the frame 10 near the bearing 34. A shaft 37 extending from the gear 36 carries the trowelling sweeps 38. I prefer to use only a two-bladed sweep for reasons to be made clear hereinafter.

A seat 40 may be provided on the frame for the operator, if desired.

In operation, I simply adjust the front and rear axles and wheels to the width of the sidewalk so that the wheels will run on the outer forming rails which are customarily wood of two by four or two by six dimensions or of metal having upper flanges of similar width. The wheel flanges are adapted to run just inside the form members.

After adjustment, the device is placed on the rails and the rear fork is clamped into position. The device is then ready for use. The operation is obvious. The operator simply pedals the device. By this means he both trowels the concrete by rotating the sweeps 38, but also propels the entire machine along the forms.

Upon completion of the job, the machine is removed from the forms and the forks released from restraint. They can then be turned so that the axles 15 and 20 are alongside each other and can lie almost flat substantially parallel to the frame 10. Since I use a two-bladed sweep, this can also be turned to a position also nearly parallel to the frame 10. In this way, the entire machine collapses to a flat device which can be easily carried in a small truck.

Figure 5:
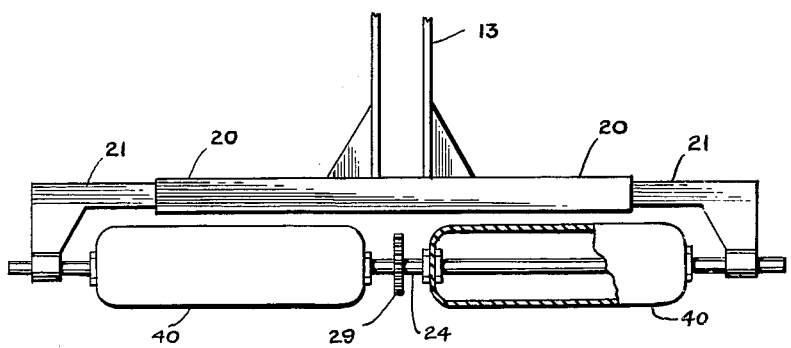
FIG. 5 is a view similar to FIG. 2 showing an alternative type of wheel, with a portion broken away to show the interior thereof.
Figure 7:
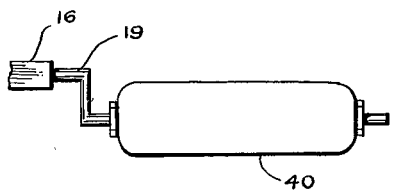
FIG. 7 is a view similar to FIG. 3 showing the alternative type of wheel.

In order to use my device on broader surfaces than a sidewalk, I provide an alternative type of support means as shown in FIGS. 5 and 7. This comprises inflated rollers 40 mounted on the axle 24 on both sides of the sprocket 29 at the rear, and similarly mounted on the stub axles 19 on the front. These rollers are large and are inflated with relatively low pressure so that they will float over the surface of the partially-set concrete and carry the weight of the machine. In all other respects, the operation of the machine remains the same.

Figure 6:
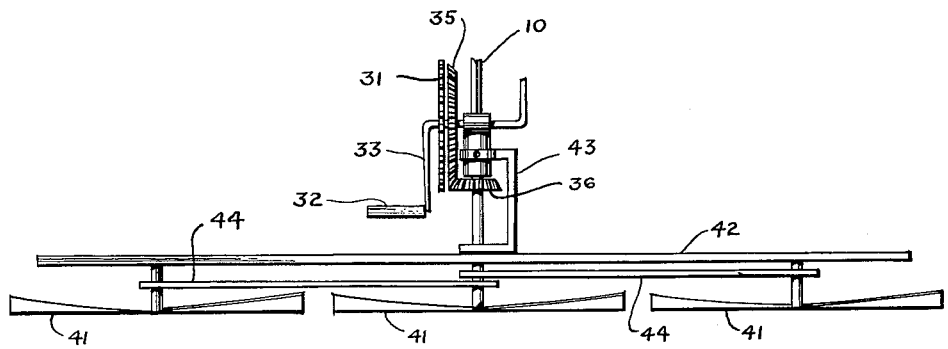
FIG. 6 is a view similar to FIG. 4 showing an alternative form of mounting the trowelling sweeps.

I also provide for an alternative means for mounting the sweeps as shown in FIG. 6. In this embodiment, I provide a plurality of smaller two-bladed sweeps 41 rotatably mounted on a carrier bar 42. The bar, in turn is mounted on the frame 10 by a bracket 43 so as to be adjustably rotated. Belts 44 between the sweeps are used to drive the outer blades from the central one. The central sweep is driven by a bevel gear as in the originally described embodiment.

It will be apparent that by rotatably moving the bar 42, a wider or narrower path will be traversed by the sweeps so that with the single machine various widths can be trowelled without changing the sweep blades.

Having thus described my invention in its embodiment I am aware that further and extensive variations may be made therefrom without departing from the spirit and scope of my invention as limited only by the following claims.

I claim:

1. A trowelling machine comprising a frame, wheel and axle means for supporting said frame, trowelling means rotatably journalled in said frame for horizontal rotation, and pedal means in said frame in driving relationship with said trowelling means whereby said trowelling means are rotated by operation of said pedals.

2. The device of claim 1 in which said wheel and axle means are adjustable to vary the distance between the wheels on a given axle.

3. The device of claim 1 in which said wheel and axle means are turnable with respect to said frame whereby said axle means may be laid alongside each other and substantially parallel to said frame for carrying.

4. The device of claim 1 in which said trowelling means comprises a pair of trowelling sweeps adapted to be driven by said pedals.

5. The device of claim 1 in which said trowelling means comprises a bar adjustably fixed to said frame, a plurality of two bladed sweep means journalled on said bar and in driven engagement with said pedals.

6. The device of claim 1 in which said wheel and axle means comprises axle means on said frame, roller means journalled for rotation relative to said frame on said axle means whereby said trowelling machine can be supported on partially set concrete.

7. A trowelling machine comprising a frame, steerable means mounted on said frame, telescoping front axles fixed to said steerable means, flanged wheels rotatably journalled on said front axles, rear axle carrying means mounted on said frame, a rear axle rotatably mounted on said carrying means, flanged wheels adjustably fixed to said rear axle whereby the distance between the wheels on said rear axle may be adjustably varied, pedal and crank means rotatably mounted on said frame in a position to be foot driven by an operator, power transmission means between said pedal and crank means and said rear axle whereby said rear axle is rotatively driven, trowelling sweep means rotatably mounted on said frame below said pedals and crank means and power transmission means between said pedal and crank means and said sweep means whereby said sweep means is adapted to be rotatively driven.

8. A trowelling machine comprising a frame, steerable means mounted on said frame, telescoping front axles fixed to said steerable means, soft elongated rollers rotatably journalled on said front axles, rear axle carrying means mounted on said frame, a rear axle rotatably mounted on said carrying means, soft elongated rollers fixed to said rear axle, pedal and crank means rotatably mounted on said frame in a position to be foot driven by an operator, power transmission means between said pedal and crank means and rear axle whereby said rear axle is rotatively driven, trowelling sweep means rotatably mounted on said frame below said pedal and crank means, and power transmission means between said pedal and crank means and said sweep means whereby said sweep means is adapted to be rotatably driven.

9. A trowelling machine comprising a frame, steerable means mounted on said frame, telescoping front axles fixed to said steerable means, flanged wheels rotatably journalled on said front axles, rear axle carrying means mounted on said frame, a rear axle rotatably mounted on said carrying means, flanged wheels adjustably fixed to said rear axle whereby the distance between the wheels on said rear axle may be adjustably varied, pedal and crank means rotatably mounted on said frame in a position to be foot driven by an operator, power transmission means between said pedal and crank means and rear axle whereby said rear axle is rotatively driven, bar means rotatably adjustably mounted on said frame, a plurality of sweep means rotatably mounted on said bar means and power transmission means engaged between said pedal and crank means and at least one of said sweep means, and between said plurality of sweep means whereby rotation of said pedal and crank means causes a driven rotation of said sweep means.

10. The device of claim 7 in which said steerable means, and said rear axle carrying means are turnable so that the front axle and rear axle can be turned to a position nearly parallel to said frame for transportation.

References Cited by the Examiner
UNITED STATES PATENTS

| | | | |
|---|---|---|---|
| 1,828,576 | 10/1931 | Palatini | 94—45 |
| 2,342,445 | 2/1944 | Allen | 94—45 |
| 2,917,979 | 12/1959 | Dening | 94—45 |
| 2,983,203 | 5/1961 | Fletcher | 94—45 |

CHARLES E. O'CONNELL, *Primary Examiner.*

N. C. BYERS, *Assistant Examiner.*